United States Patent [19]

Holmen et al.

[11] 3,924,929

[45] Dec. 9, 1975

[54] RETRO-REFLECTIVE SHEET MATERIAL

[75] Inventors: Reynold E. Holmen, White Bear Lake; Alfred H. Nellessen, Roseville, both of Minn.

[73] Assignee: Minnesota Mining & Manufacturing Company, St. Paul, Minn.

[22] Filed: Mar. 6, 1972

[21] Appl. No.: 232,023

Related U.S. Application Data

[63] Continuation of Ser. No. 594,137, Nov. 14, 1966, abandoned.

[52] U.S. Cl. ..................... 350/103; 350/67; 94/1.5
[51] Int. Cl.$^2$ .......................................... G02B 5/12
[58] Field of Search ........... 40/135; 350/67, 97–109; 94/1.5

[56] References Cited
UNITED STATES PATENTS

| 322,151 | 5/1943 | Swarovsko | 350/103 |
|---|---|---|---|
| 2,037,773 | 4/1936 | Egnon | 40/208 |
| 3,140,340 | 7/1964 | Weber | 350/103 |
| 3,359,671 | 12/1967 | Nier et al. | 350/103 |

FOREIGN PATENTS OR APPLICATIONS

| 987,243 | 3/1965 | United Kingdom | 350/67 |
|---|---|---|---|
| 547,786 | 9/1956 | Italy | 350/101 |

*Primary Examiner*—Ronald L. Wibert
*Assistant Examiner*—Michael J. Tokar
*Attorney, Agent, or Firm*—Alexander, Sell, Steldt & DeLaHunt

[57] ABSTRACT

A retro-reflective article having a retro-reflectivity of at least 400 candle power per foot candle per square foot when measured by a detector at an angle of 0.2 degrees divergence from an incident light beam and having a plurality of cube-corner retro-reflecting units and septa embossed on one surface, the septa being disposed to divide said surface into a multiplicity of separate sealable cells with a plurality of units in each cell.

9 Claims, 5 Drawing Figures

U.S. Patent  Dec. 9, 1975  3,924,929
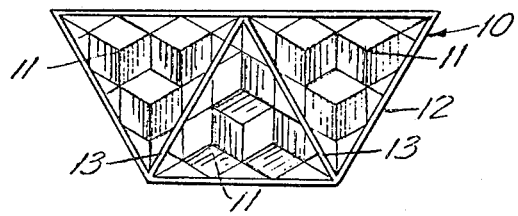
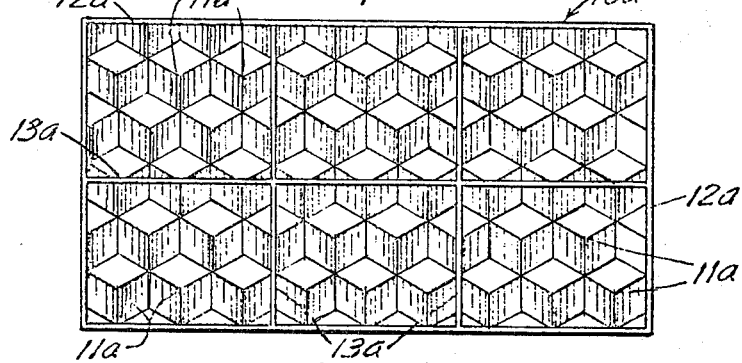
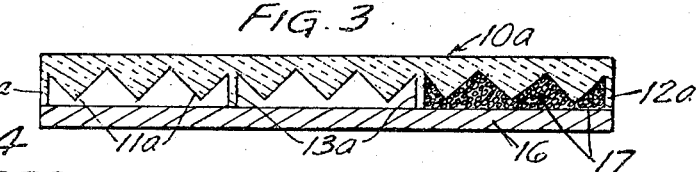
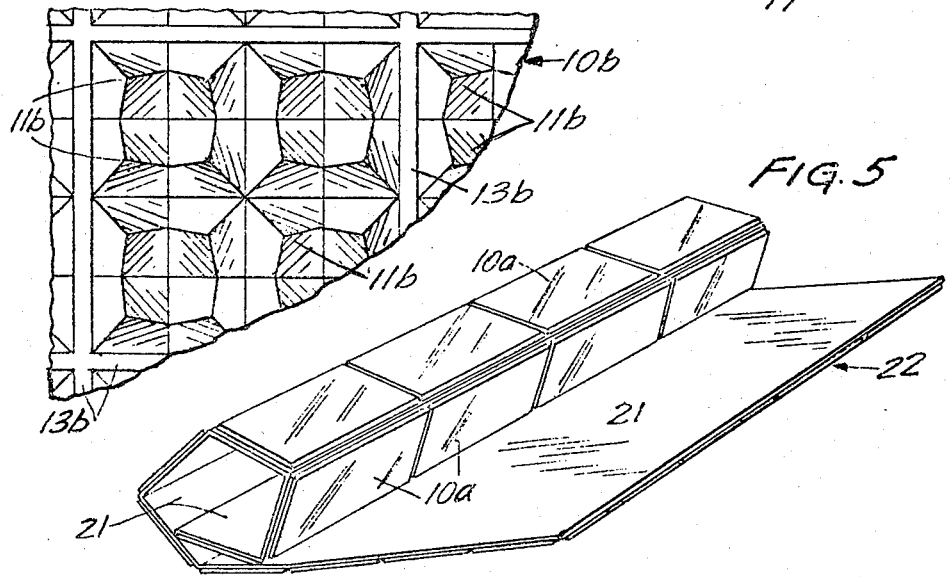

RETRO-REFLECTIVE SHEET MATERIAL

CROSS-REFERENCES TO RELATED APPLICATIONS

This application is a continuation of application U.S. Ser. No. 594,137, filed Nov. 14, 1966, now abandoned.

BACKGROUND OF THE INVENTION

This invention relates to a retro-reflecting sheet material, and in one aspect, to a cellular cube-corner retro-reflecting sheet material affording increased performance over prior known material.

The fundamental characteristic of reflex-reflecting or retro-reflecting material is its ability of returning back a brilliant cone of light toward the source of an angularly incident ray. This is to be distinguished from mirrors which cause specular reflection and from diffuse reflecting surfaces which scatter the incident light in all directions without selective return in the direction of incidence.

It has been conventional practice to form letters on highway signs by applying retro-reflective articles in the form of a multiplicity of unitary circular buttons upon a sign board. The buttons are arranged to block in or outline a letter, or other indicia. These buttons comprise a lens of transparent material, the rear surface of which is embossed with cube-corner retro-reflective units. A metal plate is usually sealed to the edges of the circular lens. These buttons commonly vary in diameter from one-half inch to seven inches (13mm–18cm). In arranging circular buttons however, to block in indicia, a large amount of the area to be covered is lost between the buttons with a resulting measurable decrease in brilliance over what might exist if the area were completely covered by such material. Further, when one of these buttons becomes damaged, allowing dirt or moisture to contaminate the cube-corner retro-reflective units embossed on the rear surface thereof, the reflective properties of the entire button are soon lost. This further decreases the brilliance and legibility of the sign at night and eventually the sign requires maintenance.

Another commonly employed material is cube-corner sheeting which has a reflective metal coating on the side embossed with cube-corner retro-reflecting units. This coating materially decreases the brilliance of the sheeting and causes the same to appear undesirably dark during daylight hours.

The sheet material of the present invention would materially increase the brilliance of the indicia on a sign by increasing the unit area covered by a cube-corner retro-reflective material. At the same time, the sheet material of this invention is constructed so that far less maintenance on the signs is required. Further, the sheet material of the present invention may be cut to form letter copy, and time and material need not be utilized in edge sealing to protect the cube-corners from contamination by dust or moisture.

The material of this invention has an advantage over the cube-corner material which has the cube-corner rear surface vapor-coated and painted in that the material of this invention offers greater retro-reflective brilliance and does not appear to be dark in color during the daylight hours.

The material of the present invention affords these advantages because the cube-corner prism retro-reflecting units in the material have a substantially continuous prism-air interface and the material has a novel multicellular structure. The cells afforded by the present invention are of a size such that the loss of the retro-reflectivity over the area of an occasional entire cell does not cause any significant decrease in total brilliance of a legend formed from our material. The built in cellular structure also permits cutting of the material to form the desired indicia or legends without the added operation of edge sealing.

The brilliant cellular retro-reflective sheet material of the present invention will have a great advantage in the making of signs for streets and highways. The present invention provides a material which will exhibit the high brilliance needed for long-range advance warning to motorists travelling at high speeds along the super highways. Also, this cellular structure provides a long-lasting sign in that damage to a sign by vandals striking the same with pop bottles or rifle bullets will be limited to only those cells actually struck and broken by the force and will not involve a significant area of the entire indicia or legend as is the case with prior art unitary cube-corner sheeting or button-like structures.

Each sheet or plate of material constructed in accordance with the present invention includes at least three cells and each cell is polygonal and contains at least three cube-corner retro-reflecting units, whether said units are formed to represent a cube section formed by a near diagonal cut of a cube or whether they contain three full square side walls of a cube and the included trihedral angle. The cell structure provides an improved material and the area thereof occupied by septa defining said cell should be kept to a minimum since the area so occupied is lost for retro-reflective purposes.

The present invention further provides a retro-reflective sheet material of any desired size from which indicia for signs may be cut. In a preferred embodiment the sheet material of this invention may be rolled or folded even though the cube-corners are embossed on a rigid transparent material. This is accomplished by adhering a multiplicity of mating small separate strips or plate-like cube-corner articles in a predetermined close pattern on a flexible backing. The cube-corner articles are preferably aligned to place edges of the same in an axial alignment with respect to the direction the material will be rolled, or they may be aligned such that the same may be folded once along a joint.

These and other novel features and advantages will become more apparent after reading the following detailed description which relates to the accompanying drawing wherein:

FIG. 1 is a rear view of one cube-corner cellular retro-reflecting article formed in accordance with the present invention;

FIG. 2 is a rear view of another article formed in accordance with the present invention;

FIG. 3 is a fragmentary vertical sectional view of a retro-reflecting sheet material formed in accordance with the present invention;

FIG. 4 is an enlarged fragmentary rear view of an article formed in accordance with the present invention having cube-corner retro-reflecting units illustrating a second embodiment; and FIG. 5 is a perspective view of a small sheet of material formed according to the present invention and partially rolled.

Referring now to the drawing, FIGS. 1 through 3 illustrate two articles generally designated 10 and 10a having different geometric shapes and formed with cells of different shapes in accordance with the present invention. Each article is monolithic and is made from a transparent polymeric solid material, for example polymethylmethacrylate, polystyrene, or celluloseacetate, by the use of suitable pressing or molding techniques known in the art. The articles 10 and 10a have a smooth light receiving front face and the back face (shown in FIGS. 1 and 2) has embossed thereon a multiplicity of trihedral prismatic retro-reflecting units 11 and 11a separated into cells by interconnecting septa. In the preferred embodiment the front face and the free edges of the septa are disposed in parallel planes and the articles have a uniform thickness, although the articles could have curved faces or flat nonparallel faces to make the material less directional. The articles thus each have throughout an area within its perimeter a substantially smooth uninterrupted front face and the back face opposite said area is formed with units 11 and 11a and with intervening septa to form a plurality of cells.

The plate-like article 10 shown in FIG. 1 is trapezoidal in shape and is embossed with contiguous prismatic cube-corner retro-reflecting units 11, each being formed by three smooth planar surfaces meeting in a point and disposed at right angles to each other. Wall members or septa 12 border the plate 10 and are continuous with septa 13 which divide the article 10 into three similar cells, each cell of which includes three cube-corner retro-reflecting units 11. As illustrated, each of these retro-reflecting units is defined by planar surfaces amounting to substantially three complete sides of a cube.

FIG. 2 illustrates another embodiment of an article formed in accordance with the present invention wherein the article 10a is rectangular having septa 12a bordering the article and septa 13a dividing the article into separate rectangular cells also having a rectangular configuration and enclosing within each cell three or more contiguous cube-corner retro-reflecting units 11a. The lead lines on the numerals are directed to the points of the units.

It is desired that the cells be as small in size as possible but yet the reflectivity of an article must, as a practical matter, be sufficient such that the non-retro-reflective areas caused by the septa forming a grid and the pattern of polygonal cells on the rear surface of the article do not constitute a greater area than that defined by retro-reflecting units. Preferably the area of an article occupied by the septa is such that their area compared to the area occupied by retro-reflecting units results in a measure of the retro-reflectivity of at least 400 candle power per square foot (930 square centimeters) of area per foot candle of transmittible incident light measured at 0.2 degrees divergence from a light beam at −4 degrees incidence. The cells should therefore preferably have a retro-reflective area not less than 0.006 square inch (4 square millimeters) or greater than one square inch (6 square centimeters) and should include not less than 3 retro-reflecting units. The units may have a width, measured between centers of opposed edges of facets defining a cube corner retro-reflecting unit, of between about 1/25 and ⅜ inch (1mm and 10mm). The septa should have a free bondable edge surface of at least 1/100 inch (0.2mm) in width and preferably not over ⅛ inch (3mm) and indeed never over ¼ inch (6mm) wide, giving an area on the free edge of the septa sufficient to provide a bonding surface for the article to a backing sheet.

FIG. 3 illustrates a vertical section through an article such as 10a with a backing 16 bonded uninterruptedly to the free edges of the septa 12a and 13a. This backing 16 is preferably a material which is essentially vapor impermeable and durable when exposed to the weather. Examples of such materials for the backing are aluminum sheeting, galvanized steel, various laminates and/or durable polymeric film-like sheet materials suitably formed, for example, of polymethyl methacrylate, polyesters, polyamides, polyvinyl fluoride, polyvinyl chloride, or polychlorotrifluoroethylene. This backing may be flexible or rigid, but it must be hermetically bonded uninterruptedly to all the free edges of the septa providing a multiplicity of hermetically sealed cells which are each free from contamination by dust particles or moisture to maintain a substantially complete prism-air interface on the smooth facets of the retro-reflecting units 11a. There is no silvering or other reflective coating on the units. In fact, such coatings only degrade or diminish the retro-reflectivity of the article.

The free edges of the septa form a grid and may be bonded to the backing by various means such as heat sealing (using a grid next to the backing corresponding to the pattern of the septa); adhesives, either pressure sensitive or heat or solvent activatable adhesives; or by using a solvent which attacks the septa to make the free edge tacky and, preferably, the backing material to thus form a bond. The adhesive may be applied to the face of the backing, to the face edges of the septa or to both. Further, a polymerizable syrup, e.g. methylmethacrylate syrup, could be applied to the backing or septa to bond the articles. It is important, however, to avoid exposure of the facets forming the retro-reflecting units to the solvents, adhesives or excessive heat.

It will be noted in FIG. 3 that the free edge surfaces of septa 12a and 13a are spaced rearwardly from the smooth front surface of the article a distance greater than peaks of the cube-corner reflecting units 11a, such that an air space is formed between the entire retro-reflecting unit and the backing. As the size of the retro-reflecting units increases beyond the 1/25 inch (1mm) size it becomes increasingly feasible to limit the rearward extent of the septa such that they terminate in edge surfaces spaced from the front surface of the article only as far rearward as the rearmost points of the retro-reflecting units. The septa must be spaced at least as far as the rearmost points or the prism-air interface is disturbed by contact of the facets with the backing and when the backing is coated with an adhesive layer some degradation of the retro-reflective effect of the units occurs.

As shown in FIG. 3, for one cell, the voids formed between the article 10a and the backing 16 may, for example, be filled with a particulate material 17 affording a back filling to strengthen the construction of the sheeting without degradation of the retro-reflectivity of the material. The particulate material 17 maintains a substantially continuous prism-air interface with the facets of the cube-corner units because the particles afford substantially only point contact with said facets. Examples of such particulate material are glass bubbles, granules of calcium sulfate and pigments, preferably between 2 to 100 microns in size. The more nearly spherical the particulate, the larger the size of the particulate may be, within this range, without excessive surface contact. The particulate could be fused together, if desired, provided the point contact aforenoted is maintained.

FIG. 4 shows a fragmentary rear view of an article 10b divided by septa 13b to place sixteen retro-reflecting units 11b within a cell. The units 11b are defined by 3 planar facets forming a point and intersecting each other at right angles. The facets are each less than a complete wall of a cube but afford good retro-reflection and the groups of four cube-corners afford easy division of the article into cells each having cube-corners in some multiple of four, but the area of the cell should not be greater than 1 square inch (6 square centimeters).

A multiplicity of the articles, such as either 10, 10a or 10b, may be bonded to a flexible backing, such as a polyester or polyvinyl chloride web, affording a large sheet of cellular cube-corner retro-reflecting material from which indicia may be cut for forming a sign. A fragment of such a sheet 22 is illustrated in FIG. 5 with a plurality of articles 10a bonded to a flexible backing web 21. Such sheeting may be rolled with the adhered plate-like articles 10a aligned to permit folds to be formed therein which extend axially of the roll of material. The articles 10a are placed on the backing in such a manner that when placed on a flat article the edges of each adjacent plate-like article are contiguous to afford substantially complete coverage of the sign board upon which such sheeting may be attached. FIG. 5 illustrates a plurality of rectangular articles such as are illustrated in FIG. 2 or in FIG. 3 positioned in aligned relationship along two adjacent edges of each article, allowing the same to be rolled or folded in either direction. Thus articles such as 10a may be adhered to a large flexible sheet or the article 10a may be suitably bonded to a rigid backing 16 which in turn may be adhered to a flexible web 21.

Sheeting, a portion of such as is illustrated in FIGS. 2, 3, 4 and 5, may be cut to form letters. This will obviously cause some to be cut and the respective hermetic seals to be broken. The cell size is such however that, even though the retro-reflecting units in a cut cell become contaminated and lose their retro-reflecting property, only small insignificant segments of a sign or legend are lost since the retro-reflective area of a cell preferably is not greater than one square inch (6 square centimeters).

Providing a substantially complete prism-air interface to the retro-reflective unit rather than coating the same with a reflective metal finish increases the efficiency of cube-corner units since all of the reflection of the light is carried on within the transparent material forming the cube-corner prism. Further, sheet material according to the present invention affords an advantage over reflective-coated cube-corner material in that the sheet of this invention does not have a darkened appearance in the daylight. Of course, colored transparent material of either a silver white, red or yellow will maintain its colored appearance satisfactorily in the daylight as well as under the artificial light at night.

Having thus disclosed the present invention by reference to the accompanying drawing, it is to be understood that modifications may be made herein without departing from the spirit or scope of the present invention.

What is claimed is:

1. A cellular reflector structure having a plurality of individual adjacent cells for providing improved vandal-resistant reflectors, signs and legends having high retroreflectivity and good daytime color appearance, said reflector structure comprising a monolithic body of transparent material having a light receiving front face having a smooth uninterrupted surface area extending over adjacent cells and a rear face having a rear surface area immediately opposite and coextensive with said uninterrupted front surface area, said rear surface area having a plurality of intersecting septa visible from said front face defining and isolating a plurality of polygonal cells each from the other and having a plurality of cube-corner retroreflecting units each having a set of three mutually perpendicular facets, each said cell having an area not greater than about one square inch and containing at least three of said cube-corner retroreflecting units and the combined area within said cells being not less than the combined area of said septa, said septa having continuous free edges positioned rearward of the front face at least as far as said cube-corner retroreflecting units, which free edges permit the structure to be affixed to a backing to hermetically seal the cells individually, said cube-corner retroreflecting units being oriented in said cells to reflect light falling upon them through said front face back toward the source thereof to render said reflector structure highly visible at night and said septa improving the daytime appearance of the structure.

2. A reflector structure according to claim 1 wherein a backing is hermetically bonded uninterruptedly to all the free edges of said septa to form a plurality of hermetically sealed cells enclosing said cube-corner retroreflecting units.

3. A reflector structure according to claim 1 wherein the hermetically sealed cells contain a particulate material of a size to afford substantially only point contact with the facets defining said cube-corner retro-reflecting units.

4. A cellular reflector structure having a plurality of individual adjacent cells for providing improved vandal-resistant reflectors, signs and legends having high retro-reflectivity and good daytime color appearance, said reflector structure comprising a monolithic body of transparent material having a light receiving front face having a smooth uninterrupted surface area extending over adjacent cells and a rear face having a rear surface area immediately opposite and coextensive with said uninterrupted front surface area, said rear surface area having a plurality of intersecting septa visible from said front face defining and isolating a plurality of polygonal cells each from the other and having a plurality of cube-corner retroreflecting units each having a set of three mutually perpendicular facets, each said cell having an area not greater than about one square inch and containing at least three of said cube-corner retroreflecting units and the combined area within said cells being not less than the combined area of said septa such that the retroreflectivity of said body is at least 400 candle power per square foot of area per foot candle of transmittable incident light, said septa having continuous free edges positioned rearward of the front face at least as far as said cube-corner retroreflecting units, which free edges permit the structure to be affixed to a backing to hermetically seal the cells individually, said cube-corner retroreflecting units being oriented in said cells to reflect light falling upon them through said front face back toward the source thereof to render said reflector structure highly visible at night and said septa improving the daytime appearance of the structure.

5. A retro-reflective article according to claim 4 wherein said article is of uniform thickness with said front surface smooth and planar, and with said free edges of said septa disposed in a plane parallel to said front face.

6. A retroreflective sheet material having a plurality of individual adjacent cells for providing improved vandal-resistant reflectors, signs and legends having high retroreflectivity and good daytime color appearance, said sheet material comprising a monolithic article of transparent material having a light receiving front face having a smooth uninterrupted surface area extending over adjacent cells and a rear face having a rear surface area immediately opposite and coextensive with said uninterrupted front surface area, said rear surface area having a plurality of intersecting septa visible from said front face defining and isolating a plurality of polygonal cells each from the other and having a plurality of cube-corner retroreflecting units each having a set of three mutually perpendicular facets, each said cell having an area not greater than about one square inch and containing at least three of said cube-corner retroreflecting units and the combined area within said cells being not less than the combined area of said septa, said septa having continuous free edges positioned rearward of the front face at least as far as said cube-corner retroflecting units, which free edges permit the structure to be affixed to a backing to hermetically seal the cells individually, said cube-corner retroflecting units being oriented in said cells to reflect light falling upon them through said front face back toward the source thereof to render said reflector structure highly visible at night and said septa improving the daytime appearance of the structure, and a backing hermetically bonded uninterruptedly to all the free edges of said septa of said monolithic article to form hermetically sealed cells enclosing said cube-corner units.

7. A retro-reflective sheet material according to claim 6 wherein said article is plate-like having a uniform thickness with said front surface being planar and with said cells having a uniform size.

8. A retro-reflective sheet material according to claim 6 wherein said sheet material comprises a plurality of said retro-reflective articles positioned in contiguous relationship, and wherein said articles are joined by a flexible material permitting the sheet material to be rolled or folded.

9. A retro-reflective sheet material according to claim 6 wherein the hermetically sealed cells contain a particulate material of a size to afford substantially only point contact with the facets defining said cube-corner retro-reflecting units.

* * * * *